Figure 3:
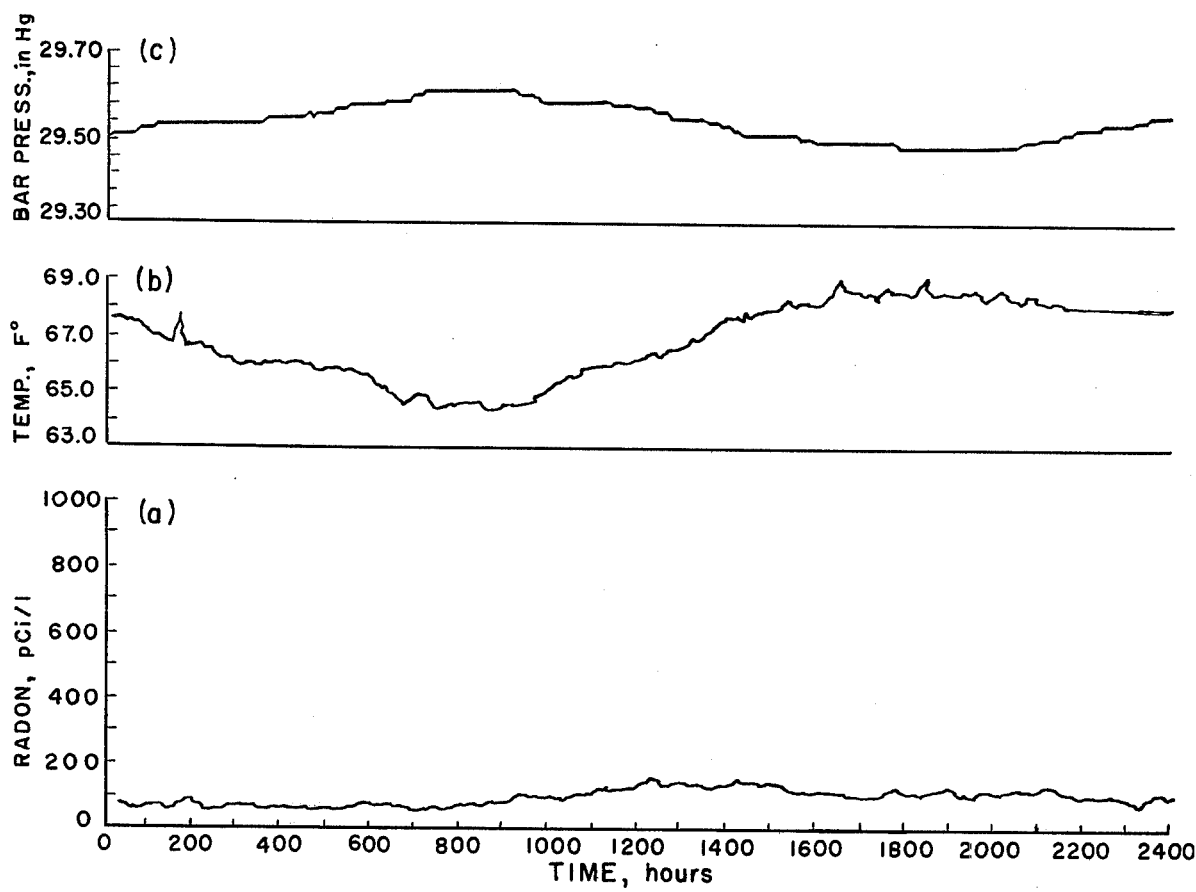

United States Patent [19]

Franklin et al.

[11] 4,053,775
[45] Oct. 11, 1977

[54] CONSTANT FLOW RADON GAS MONITOR

[75] Inventors: John C. Franklin; Thomas O. Meyer, both of Spokane, Wash.

[73] Assignee: The United States of America as represented by the Secretary of the Interior, Washington, D.C.

[21] Appl. No.: 653,314

[22] Filed: Jan. 29, 1976

[51] Int. Cl.² .................. G01T 1/20; G01N 21/24
[52] U.S. Cl. .................. 250/364; 250/255; 250/435
[58] Field of Search ........... 250/255, 364, 380, 432, 250/435, 358 R

[56] References Cited

U.S. PATENT DOCUMENTS

| | | | |
|---|---|---|---|
| 2,892,091 | 6/1959 | Sawle | 250/435 X |
| 3,665,180 | 5/1972 | Guillot et al. | 250/358 R X |
| 3,968,371 | 7/1976 | Greendale | 250/380 |

*Primary Examiner*—Davis L. Willis

*Attorney, Agent, or Firm*—Thomas Zack; Donald A. Gardiner

[57] ABSTRACT

A method and system to continuously monitor the radon concentration in air. As disclosed, these readings are made in situ in a uranium mine to indicate whether safe working conditions exist therein. The apparatus forming this invention has one or a series of detectors each having: a filter network; a flow control valve; a scintillation cell; a flow meter; a gas pump; a photomultiplier tube with a voltage control circuit; and a signal discriminator with an amplifier and shaper circuit. External of the detectors and connected thereto is a counting and recording system which counts and records the voltage pulses which are indicative of the alpha count on the detector cell. When connected seriatim each detector can be sequentially monitored for a predetermined time interval by the counting system so that the local radon level can be continuously monitored for 24 hours per day seven days a week.

8 Claims, 3 Drawing Figures

CONSTANT FLOW RADON GAS MONITOR

BACKGROUND OF THE INVENTION

1. Field of the Invention

This invention described herein is a method and the system to practice that method used to continuously monitor the alpha activity of a radioactive gas.

2. Description of the Prior Art

When radon gas diffusing from the walls of a uranium mine decays it goes through a series of solid radioactive isotopes known as radon daughters. Particles of dust or moisture may carry these isotopes to the lungs of miners. To reduce this radioactive inhalation and its possible carcinomatous effect it has been suggested that the mine walls be coated with various types of radon gas sealants. Since the radon concentration can continually vary due to factors like the surface barometric pressure, the mine air pressure, the mine temperatures, the mine humidity, and the blasting in the mines, it was decided that continuously monitoring the radon concentration levels with a system would most accurately determine the effectiveness of the sealants under investigation.

Presently used methods and apparatus for monitoring radon by alpha particle concentration levels can be divided into three broad categories: the Lucas flask way, the radon survey instrument way, and the two filter method. Each has its own advantages and disadvantages the most notable disadvantage for our purposes being the inability to monitor continuously. Either a person has to take data all the time or a batch sample has to be analyzed. The Lucas flask method can be considered a batch sampling technique whose operational parameters can be found in the September, 1959 article of Review of Scientific Instruments (volume 28, No. 9) entitled "Improved Low-Level Alpha Scintillation Counter for Radon" by H. F. Lucas. In the April 1974 article of Health Physics (Vol. 28, pp. 472-474) entitled "Rapid Measurement of Radon, Decay Products, Unattached Fractions, and Working Level Values of Mine Atmospheres" by A. L. Hill, the details of the operation of the second of these three methods is explained. The two filter method is also a batch sampling method which takes into consideration the flow rate of a sample, the alpha activity on a back filter, and surface area of its cylinder. Another Health Physics publication, volume 18, 1970, on pages 113-122 entitled the "Study of the Two-Filter Method for Radon 222" explains this method. What we have done over these methods and the known prior art is to develop an improved system and method which continuously monitors radon concentration levels. Three relevant references of interest are known.

Two of these are the U.S. Pat. No. 2,878,390 to F. K. Campbell and U.S. Pat. No. 2,898,800 to G. Bergson. The Campbell invention is used to detect the alpha, beta and gamma radiation from radon gas absorbed in a charcoal filter. However, in such an arrangement it would be impossible to separate out the concentration of alpha particles or to continuously monitor their concentration. In the Bergson invention gas is continuously monitored by spectrographic absorption to determine its gaseous components. It is not concerned with detecting the concentration of alpha particles or any radioactive material nor is its detecting device capable of operatively being substituted for our scintillation detector cell.

The third relevant reference of interest is the device described in IEEE Transactions on Nuclear Science Vol. NS-22, No. 1, February 1975, "Design of a Continuous Digital-Output Environmental Radon Monitor" by Wrenn, Spitz and Cohen. This device is designed to measure "environmental levels of radon 222." Typical purposes include indoor air sampling (residential monitoring). While this monitor most nearly approximates our unit, significant differences exist. The monitor of Wrenn, Spitz and Cohen uses passive diffusion through an open-celled foam for sample exchange and electrostatic accumulation of signal enhancement to accommodate low radon levels. Our monitor uses forced-flow sample exchange in view of the relatively high radon concentrations it was designed to measure in uranium mines.

The primary object of this invention is an improved method and system for monitoring alpha activity.

Figure 1:
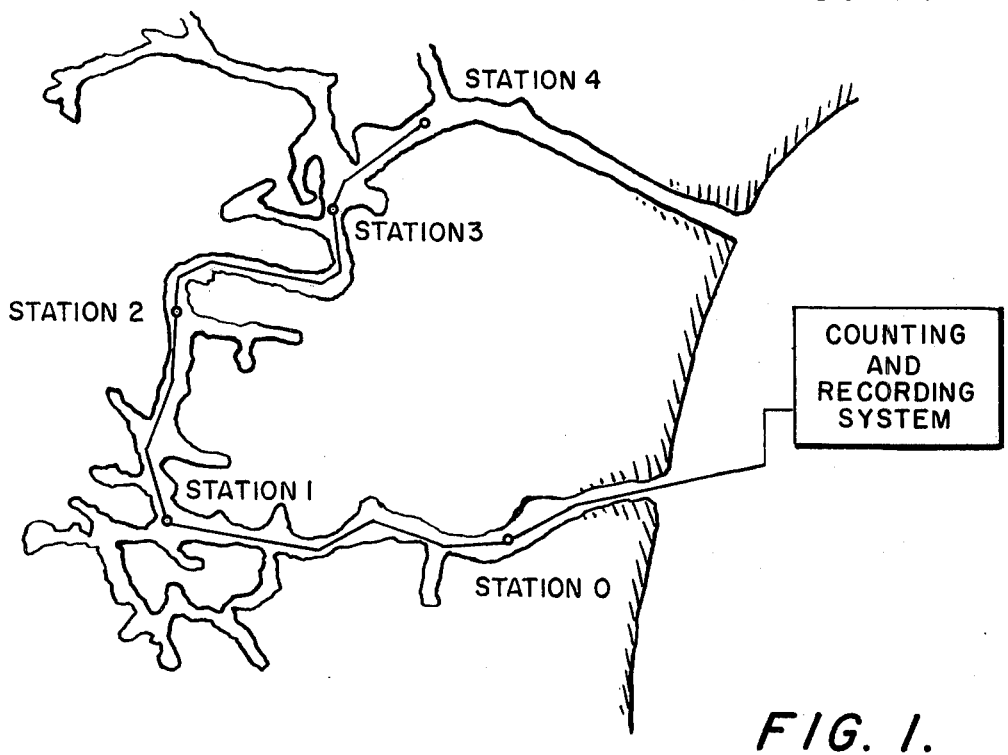

FIG. 1 shows in block format how a series of detectors could be set up within a uranium mine and connected to a data counting and recording system.

Figure 2:
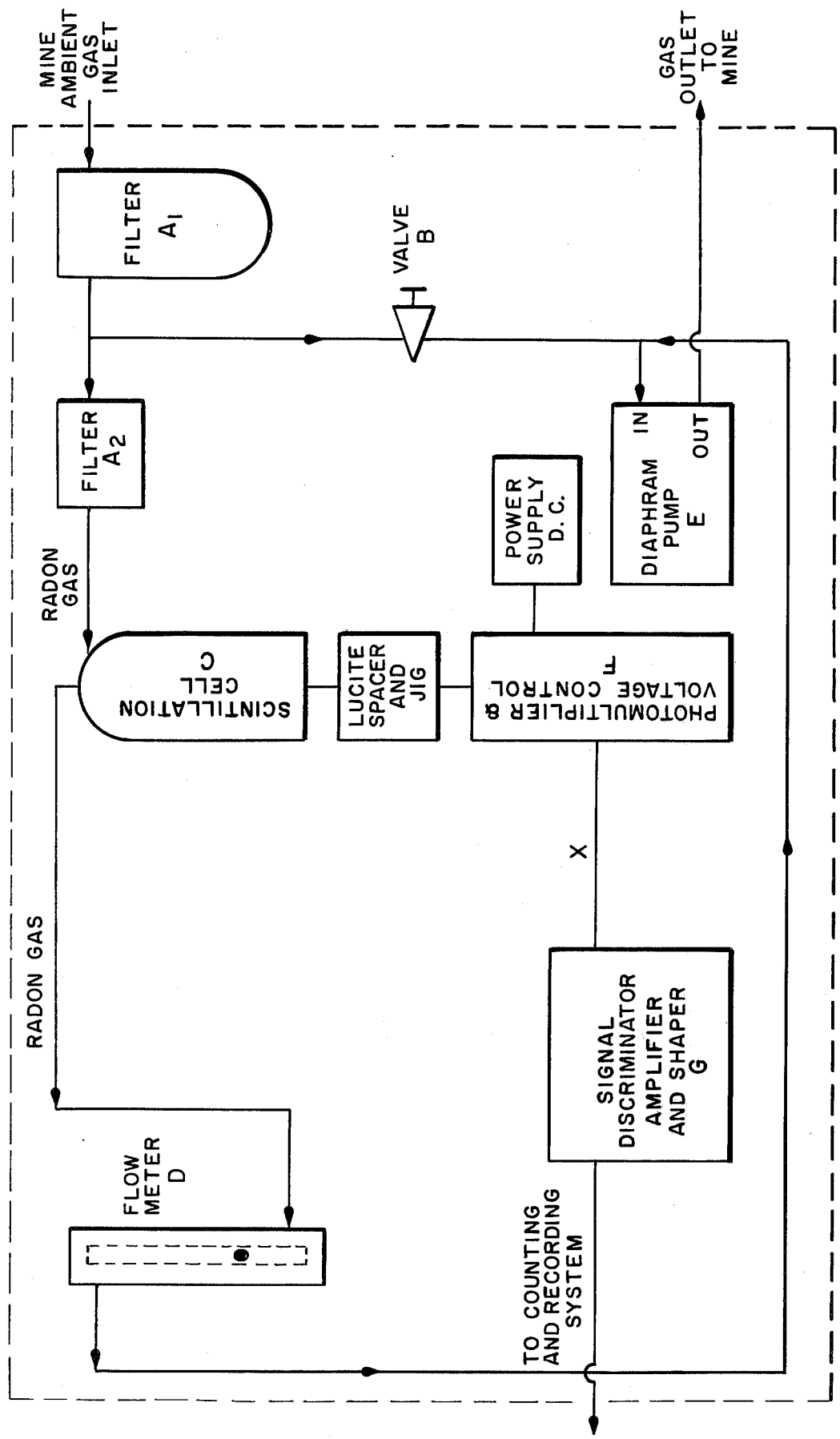

FIG. 2 schematically illustrates the basic components of one detector system.

FIG. 3 is a graph of the radon concentration.

Generally speaking, the invention herein may be classified as the detector system and its method of operation which is a subcomponent of a data acquisition system. FIG. 1 depicts in block format this data acquisition system. As shown five detector stations or systems are spaced from each other within a uranium mine shaft. Each detector system would have all of the components represented in FIG. 2. In one working embodiment each detector is monitored up to twelve times an hour for a preset time to provide continuous monitoring within the uranium mine. Such a procedure would allow very low alpha concentration to be monitored longer to reduce statistical errors. Initially each detector was calibrated in the laboratory by the Lucas flask method previously mentioned. After each detector is monitored by a counting and recording system for its preset time interval, the next detector can be sequentially monitored. After a given detector is monitored it would reset itself and the monitoring sequence through each of the five detectors would start again.

The basic function of the FIG. 1 detection system is to detect alpha emissions from a radon gas sample. It does this by converting the alpha emissions into electrical pulses in the millivolt range and then amplifying these pulses before sending them to a counting system. The counting system only counts the pulses from a given detector for a preset time interval after which a scanner sequences it and a printer records the accumulated counts on a paper tape. The counter, scanner, and recorder are shown in block diagram format in FIG. 1.

The radiation detector system of FIG. 2 is contained in a single housing represented by dotted lines. It has two filters A1 and A2 to, respectively, remove moisture and particulate matter from the gas sample and to remove radioactive daughters in the air. A valve b and a flow control meter D control the amount and measure the quantity of air-radon mixture entering the system. Diaphragm pump E causes the radon gas sample to enter and exit from the system. After passing through filter A2 the gas that is taken into the system is sent to scintillation cell C. Between the filter A2 and this cell new radon daughters are formed which are measured by this invention. Prefiltering out of radon daughters before the radon gas reaches the cell prevents the accumulation of excess background radiation therein. Gases displaced from the cell are forced through its exhaust tube to flow meter D to the intake of the pump after which they are expelled back into the ambient mine atmosphere being sampled. The photomultiplier tube F receives the radiate energy wave pulses from the scintillation cell and converts them into electrical pulse representations under a controlled voltage. These pulses are transmitted to circuitry G which acts as an electrical filter or single channel analyzer to block signals which are either below or above a preselected set of voltage values. Voltage impulses falling within these limits are amplified and brought to a single voltage and deviation to facilitate counting and recording by the external equipment mentioned in FIG. 1.

Filter A1, used to remove moisture and particulate matter, was in a working embodiment a Watts model with a sintered bronze element manufactured by Watts Regulator Company Inc. of Lawrence, Mass. This particle filtration was specified to be at 20 microns. It acts to protect components and to remove dust containing radioactive particles which might get into the cell's chamber to give increased background radiation and spurious results. The second filter A2 is much finer, filtering to 0.8 microns, and is located downstream from filter A1. It acts to remove radioactive daughters from the radon gas sample. It can easily be replaced daily externally of the housing in a matter of seconds. As indicated by the direction of the arrows in FIG. 2, signifying the direction of gas flow, the ambient mine gas — part of which is radon gas — entering the detector system is split after passing through filter A1 to go either directly to the filter A2 or to the pump E.

Flow control valve B is placed in the path to the pump and acts to regulate the amount of gas passing into the cell by diverting a portion directly into the pump. Flow rates between 0.5 liters per minute and three liters per minute may be sent to the detector cell by this method under a relatively constant gas pressure. Results are not drastically affected by either flow rate or pressure variation.

After passing through filter A2 the regulated gas flow arrives at the detector or scintillation cell C. Since this cell is expected to operate on a continuous basis the commercially available model LAC-2 cell by Johnston Laboratories of Cockeysville, Md. with a single inlet was modified by removing its glass stopcock and inserting another tube as an outlet exhaust tube. Radon 222, with its daughter products of polonium 218 and polonium 214 each emit one alpha particle which physically contacts the cell's radiation emitting surface. These particles have an initial energy between 5.49 to 7.68 million electron volts (MEV).

Providing an electrical output for the cell is the photomultiplier (PMT) dynode divider network. This PMT is a standard off the shelf item such as type 6342A manufactured by RCA. A lucite spacer and alignment jig may be interposed between the cell and the PMT in the path of the cell's radiation to separate these components and align these component parts. The high voltage power supply for the PMT network supplies between 600 and 1,100 volts d.c. thereto for operational purposes. The pulse output $x$ from the PMT is proportional to the alpha count. It is sent to a signal discriminator, amplifier and shaper circuit G. Here the signal $x$ is allowed to pass if it falls above or below preselected voltage values. It then is amplified by a gain of about 20 and shaped before being sent to the counting and recording system.

The purpose and function of the counting and recording system is to count the number of alpha particles received and then to record this count on some permanent medium. Typically the counts from a single detector will run somewhere between 50 to 20,000 counts per minute. They are recorded by printing on paper tape the counts, the Julian date, hours, minutes, and detector identification indicated. Broken down the system consists of a counter, a scan interval comparator, a sample time comparator, a channel or detector identification, a digital clock, and a digital printer operatively connected to form the data system. A counter and digital clock used were from Electronic Research Company (ERC) of Overland Park, Kans., having the respective model numbers 2306A and 2446. This clock has internal crystal control and an accuracy of 12 seconds per month. It outputs in binary coded decimal (BCD) for all digits and is connected to the printer. This counter counts pulses at the maximum rate of $20 \times 10^6$ pulses per second and has a parallel standard BCD output coupled to the printer. The counts are accumulated for a preset sample time and then visually displayed by the light emitting diodes (L.E.D.) of the front panel readout and also the BCD output is sent to the printer. One type of scan interval comparator used was ERC model 250401 serial input comparator. It receives and accumulates one second pulses from the digital clock until a preset time (up to 999 seconds) is reached. When this time elapses a signal is outputted to a logic circuit which activates the print command and printer. The channel identification is nothing more than an indicator, like a decade counter, which tells what channel or detector system is being monitored. One type of digital printer used is model 691 made by United System Corporation of Dayton, Ohio. It prints 14 columns including the time of day, channel identification, and six digits of count information.

After set up the total instrument package was calibrated by separately calibrating each individual component and then the working system. Lucas flasks were used to calibrate each detector by connecting them to the return line to the chamber at the same time the detector was being monitored by the counter. Results were checked against the two filter method. Based on all of these tests and calculations it was determined that the overall data acquisition system including all detectors and the counter used were accurate to an overall average of at least 85 percent of the total count. The versatility in counting time of this system in being able to take up to 1,440 readings a day makes this system an extremely useful research tool.

FIG. 3a is an actual reading obtained from one of the five detectors (station 1) of the FIG. 1 system. It plots time in hours on a 24 hour clock as the common abscissa versus radon concentration (a), temperature (b), and barometric pressure (c) for the ordinate. For this graph the radon concentration is expressed in picocuries per liter of air (p Ci/l), the temperature in degrees Fahrenheit, and the mine barometric pressure in inches of mercury. These radon readings are typical of those recorded on the other four detectors. Generally, at between 9 a.m. until 9 p.m. (0900 to 2100) the concentration will rise. After 9 p.m. it drops until 9 a.m. the next day. This follows the air temperature changes but cannot be connected directly to temperature. Changes in barometric pressure can also be noted, however, they are harder to correlate against the changes in radon concentration. One of the major reasons for our invention is this lack of correlation or correspondence of the radon concentration when measured against any single or multiple group of variables. Only by constantly monitoring the concentration twenty four hours a day seven days a week can a true picture be obtained of the varying radon concentration.

None of the specific components or details listed for the preferred embodiments should be used to measure the scope and extent of our invention which is to be measured only by the claims that follow:

We claim:

1. A system for continuously monitoring the concentration of radon gas in air comprising:
   detector means for continuously detecting the concentration of radon gas through alpha particle monitoring and outputting electric pulses representative thereof;
   pump means to continuously force ambient gas through said detector means at a predetermined flow rate;
   filter means for filtering out moisture, particulate matter and radon daughters from the ambient gas before it passes to said detector means; and
   counting and recording means operatively connected to said detector for continuous electronically counting the number of respresentative alpha particles pulses detected and recording the number counted.

2. The system of claim 1 wherein said detector means comprises:
   a scintillation cell for contacting the flow of radon gas and emitting radiation when impinged by alpha particles; and
   a radiation sensitive transducer means for converting the radiation received from said cell into representative electric pulses.

3. The system of claim 2 also including voltage control and amplifying circuitry to receive said representative pulses and output an amplified shaped pulse to said counting and recording means.

4. The system of claim 1 wherein said filter means comprises two separate filters, the first of said filters being used for filtering out moisture and particulate matter and the second of said filters being a finer filter to filter out unwanted radioactive particles.

5. The system of claim 1 wherein there are a plurality of separate detetor means each of which has its own pump and filter means, said detector means being spaced from each other at various locations within a uranium mine and connected to a common counting and recording means.

6. A method of continuously measuring the alpha particle radiation from radon gas comprising the steps of:
   continuously forcing ambient gas suspected of containing radon gas into a detector unit cell;
   filtering said moving ambient gas before it reaches the detector to first filter out moisture and particulate matter and then filter out unwanted background isotopes;
   detecting the alpha particle concentration of formed radioactive isotopes by use of a scintillation cell to obtain radiation representative of the number of radon atoms therein;
   transforming the radiation representations into representative electrical pulses by use of a radiation sensitive transducer; and
   electrically counting and recording the electrical pulses received from said transducer.

7. The method of claim 6 wherein said forcing step takes place under a substantially constant gas flow rate and pressure.

8. The method of claim 6 including the additional steps of electrically amplifying and shaping the transformed representative electrical pulses before the counting and recording step.

* * * * *